US012683813B2

(12) United States Patent
Lu et al.

(10) Patent No.: US 12,683,813 B2
(45) Date of Patent: *Jul. 14, 2026

(54) PHYSICALLY UNCLONABLE FUNCTION (PUF) GENERATION

(71) Applicant: Taiwan Semiconductor Manufacturing Company, Ltd., Hsinchu (TW)

(72) Inventors: Shih-Lien Linus Lu, Hsinchu (TW); Jui-Che Tsai, Tainan City (TW); Cheng-En Lee, Hsinchu City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 108 days.

This patent is subject to a terminal disclaimer.

(21) Appl. No.: 18/670,367

(22) Filed: May 21, 2024

(65) Prior Publication Data

US 2024/0305481 A1 Sep. 12, 2024

Related U.S. Application Data

(63) Continuation of application No. 18/064,617, filed on Dec. 12, 2022, now Pat. No. 12,022,014, which is a continuation of application No. 16/837,398, filed on Apr. 1, 2020, now Pat. No. 11,528,151.

(51) Int. Cl.
| | |
|---|---|
| *H04L 9/32* | (2006.01) |
| *H03K 19/096* | (2006.01) |
| *H04L 9/08* | (2006.01) |
| *H10D 84/01* | (2025.01) |
| *H10D 84/03* | (2025.01) |

(52) U.S. Cl.
CPC ....... *H04L 9/3278* (2013.01); *H03K 19/0963* (2013.01); *H04L 9/0866* (2013.01); *H10D 84/0167* (2025.01); *H10D 84/038* (2025.01); *H04L 2209/12* (2013.01)

(58) Field of Classification Search
CPC ................. H04L 9/3278; H04L 9/0866; H01L 21/823807; H03K 19/0963
See application file for complete search history.

(56) References Cited

U.S. PATENT DOCUMENTS

| | | | |
|---|---|---|---|
| 8,750,502 | B2 | 6/2014 | Kirkpatrick et al. |
| 9,966,954 | B1 | 5/2018 | Yang et al. |
| 10,103,733 | B1 | 10/2018 | Gurrieri et al. |
| 10,164,640 | B1 | 12/2018 | Lu et al. |
| 10,733,327 | B2 | 8/2020 | Lu |
| 10,958,453 | B2 | 3/2021 | Lu et al. |

(Continued)

FOREIGN PATENT DOCUMENTS

| | | |
|---|---|---|
| TW | 202001890 A | 1/2020 |
| TW | 202006591 A | 2/2020 |

*Primary Examiner* — Oleg Korsak
(74) *Attorney, Agent, or Firm* — Merchant & Gould P.C.

(57) ABSTRACT

A PUF generator includes a difference generator circuit with first and second transistors having a first predetermined VT. The difference generator circuit is configured to provide a first output signal for generating a PUF signature based on respective turn on times of the first and second transistors. An amplifier includes a plurality of transistors having a second predetermined VT. The amplifier is configured to receive the first output signal and output the PUF signature.

20 Claims, 5 Drawing Sheets

(56)     References Cited

U.S. PATENT DOCUMENTS

| 11,043,404 | B2 |  | 6/2021 | Lu et al. |  |
|---|---|---|---|---|---|
| 11,528,151 | B2 |  | 12/2022 | Lu et al. |  |
| 12,022,014 | B2 | * | 6/2024 | Lu | H10D 84/038 |
| 2016/0006570 | A1 |  | 1/2016 | Falk et al. |  |
| 2016/0065379 | A1 | * | 3/2016 | Holcomb | G09C 1/00 |
|  |  |  |  |  | 713/189 |
| 2017/0017808 | A1 | * | 1/2017 | Kwong | H04L 9/3278 |
| 2018/0069711 | A1 |  | 3/2018 | Lu et al. |  |
| 2018/0102163 | A1 |  | 4/2018 | Lin et al. |  |
| 2018/0102907 | A1 |  | 4/2018 | Lin et al. |  |
| 2019/0058603 | A1 |  | 2/2019 | Lin et al. |  |
| 2019/0132137 | A1 |  | 5/2019 | Zhong et al. |  |
| 2019/0165953 | A1 |  | 5/2019 | Shor et al. |  |
| 2019/0319810 | A1 |  | 10/2019 | Lu |  |
| 2019/0378575 | A1 |  | 12/2019 | Lu |  |
| 2020/0014547 | A1 |  | 1/2020 | Lu et al. |  |
| 2020/0044871 | A1 |  | 2/2020 | Lu |  |
| 2020/0084052 | A1 |  | 3/2020 | O'Connell |  |
| 2020/0099540 | A1 |  | 3/2020 | Lu et al. |  |
| 2020/0136839 | A1 |  | 4/2020 | Tsai et al. |  |
| 2020/0243122 | A1 | * | 7/2020 | Mahatme | G11C 7/062 |
| 2021/0314175 | A1 |  | 10/2021 | Lu et al. |  |
| 2023/0046138 | A1 |  | 2/2023 | Kao et al. |  |
| 2023/0388135 | A1 |  | 11/2023 | Lu et al. |  |

* cited by examiner

PHYSICALLY UNCLONABLE FUNCTION (PUF) GENERATION

CROSS-REFERENCE TO RELATED APPLICATIONS

This application is a continuation of U.S. Non-Provisional application Ser. No. 18/064,617, filed Dec. 12, 2022, which is a continuation of U.S. Non-Provisional Ser. No. 16/837, 398, filed Apr. 1, 2020, now U.S. Pat. No. 11,528,151, and titled "PHYSICALLY UNCLONABLE FUNCTION (PUF) GENERATION," the disclosures of which are hereby incorporated herein by reference.

BACKGROUND

As reliance on computer systems and the internet increases in many areas such as personal communications, shopping, banking, commerce, etc., the need for improved cyber security also increases. Many security measures may be employed, including cryptography. A physical unclonable function (PUF) is a physical object embodied in a physical structure that can be used to produce an output. The output is easy to evaluate but the output is very hard or nearly impossible to predict. A PUF can be used as a unique identification or key in secure computing and communication.

An individual PUF device must be easy to make but practically impossible to duplicate, even given the exact manufacturing process that produced it. In this respect it is the hardware analog of a one-way function. PUFs are typically implemented in integrated circuits and are typically used in applications with high security requirements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
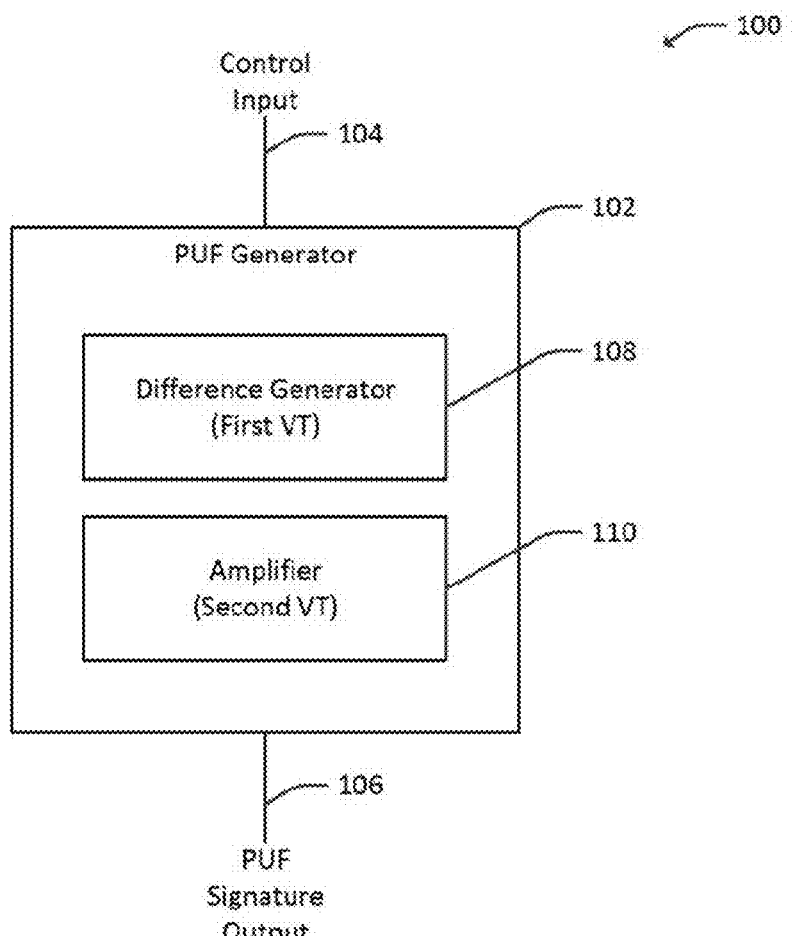
FIG. 1 is a block diagram illustrating example aspects of a physically unclonable function (PUF) generator in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As noted above, a physical unclonable function (PUF) is a physical object embodied in a physical structure that can be used to produce an output that is easy to evaluate but nearly impossible to predict. Integrated circuit (IC) devices generally include electronic circuits formed on a semiconductor substrate, or "chip," formed of a semiconductor material such as silicon. Components of IC devices are formed on the substrate by a photolithography process rather than being constructed one item at a time. The electronic devices formed on the substrate are interconnected by conductors, or wires, also formed on the substrate by photolithographic processes. Although manufactured in high volume, each IC device is unique due to physical randomness, even with the same manufacturing processes materials. This inherent variation can be extracted and used as its unique identification, as DNA to human beings. In accordance with embodiments disclosed herein, such variation is used to create a unique IC device signature used as a PUF, since it is unique, inherent to the particular device, unclonable (cannot be mimicked or duplicated), repeatable, etc.

Some general PUF methods include delay chain based PUFs and memory based PUFs. Delay chain based PUFs translate variations into delay variances. A set of delay chains made from logic gates are utilized, and due to static variations of the components of each chain, each chain will have a different delay. By sampling the various delays a signature can be produced. However, delay chain based PUFs are typically larger in size and can be unreliable since temperature can affect the delay times of the path leading to an incorrect signature result.

Memory based PUFs translate variations of devices in a bi-stable element to generate either a 1 or a 0 value. An example type of memory based PUF is a SRAM PUF. These PUFs utilize the small variations of memory cells to produce signatures. For example, a type of SRAM PUF gets its signatures from the start up states of the cells. This type of PUF is very similar to an array of SRAM cells. These cells are powered up and down through a virtual power supply. Since each cell includes a crossed coupled inverter pair whose strength can vary, when a cell is powered up it will take a random value depending on the characteristics of the cross coupled inverters. The state of each cell is then read through a normal SRAM array channel of sense amplifiers and IOs. Performance of the PUF can be enhanced by utilizing devices of various voltage thresholds (VT). In general, the voltage threshold field-effect transistor (FET) is the minimum gate-to-source voltage (VGS) that is needed to create a conducting path between the source and drain terminals.

FIG. 1 is a block diagram illustrating example aspects of a physically unclonable function (PUF) generator device 100. The PUF generator device 100 includes a PUF generator 102, a control input terminal 104 configured to receive a control input signal, and a PUF signature output terminal 106 configured to output the PUF signature. The control input signal can include a clock signal, a memory address type signal and a reset signal, for example. The illustrated PUF generator 102 includes a difference generator 108 configured to determine variations inherent in the manufacturing process and to convert these variations into electrical signals representing an electrical property differences (such as a voltage difference, a current difference, etc.), and an amplifier 110 configured to amplify the electrical signals generated by the difference generator 108 and convert the difference into a bit vector of deterministic but random bit vectors of 1s and 0s. In some examples the difference generator 108 and the amplifier 110 are combined, meaning a single structure can perform the functions of both. For example, a SRAM power up PUF can be described as self-amplifying, where the difference generation and the amplifications are performed by the same structure, such as an SRAM cell. In other PUF designs, the amplifier 110 can be shared between a plurality of difference generators 108.

To maximize the performance characteristics of the PUF generator 102, the variations of the devices used to create the difference generator 108 are maximized, while the variations of the devices used to create the amplifier 110 are minimized. In some example embodiments, this is achieved by utilizing devices of various voltage thresholds (VT). These devices can be CMOS FET devices in some examples.

High threshold (HVT), standard threshold (SVT) devices and low threshold voltage devices (LVT) generally have the same nominal operating voltage. However, HVT, SVT and LVT devices are configured to have different threshold voltages depending on the circuit design and/or application. For instance, an SVT device may have a VT of about 20% to 30% of the supply voltage. An LVT device may have a VT that is less than 20% of the supply voltage, and an HVT device may have a VT that is greater than 35% of the supply voltage. Supply voltages may range from less than 1 volt to 5.0 volts or more depending on the specific circuit, though other supply voltage levels are within the scope of the disclosure. While LVT devices have a lower turn on voltage, they tend to have increased subthreshold leakage current as compared to HVT and SVT devices. Further, HVT devices have larger turn on voltage variations than SVT devices, and low voltage threshold (LVT) devices have smaller turn on voltage variations than SVT devices. Thus, for example, HVT devices can be utilized to implement the difference generator 108 since greater variation is desired, while LVT devices can be utilized to implement the amplifier 110 since consistency is desired.

Figure 2:
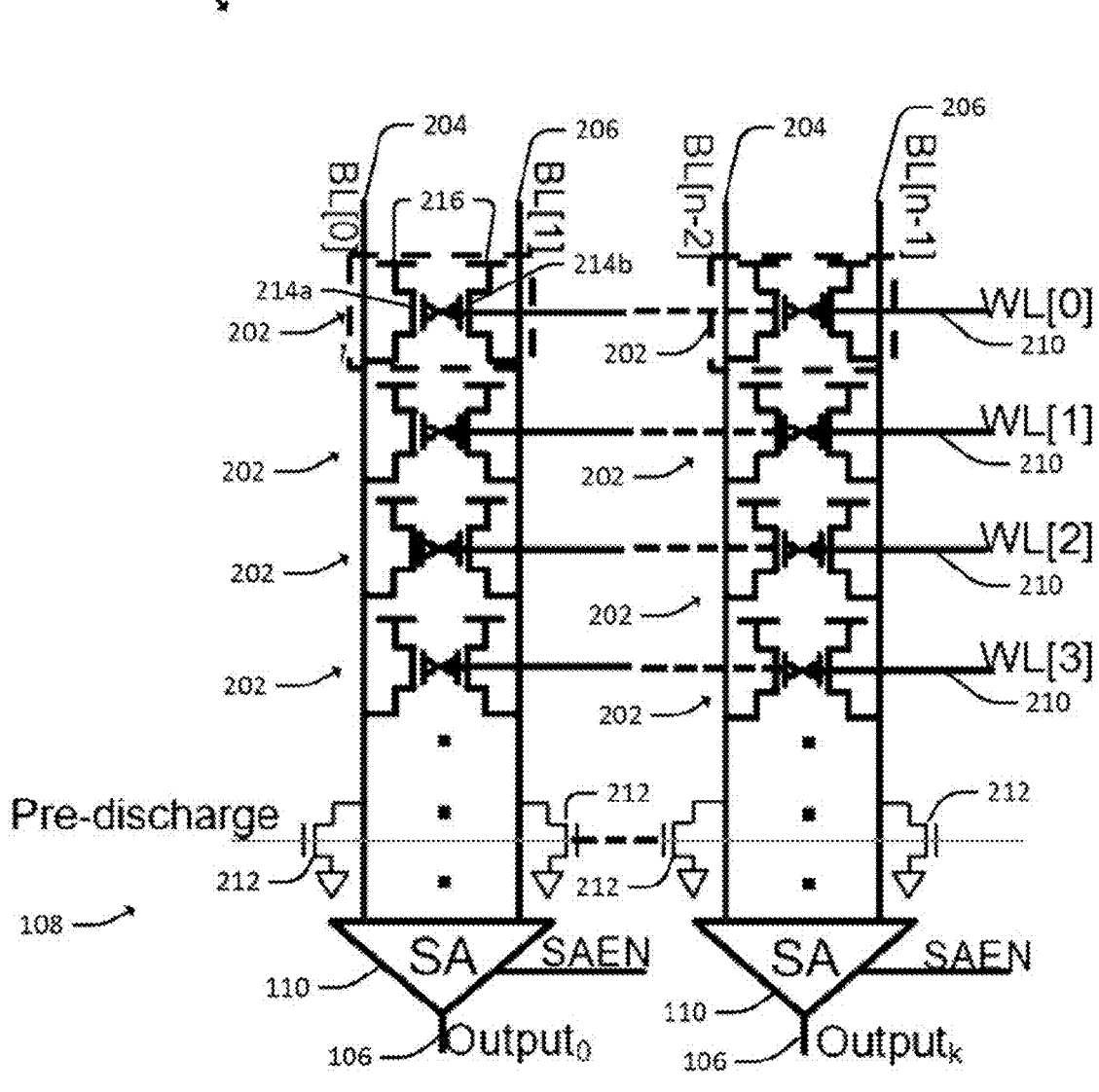
FIG. 2 is a circuit diagram illustrating an example of the PUF generator in accordance with some embodiments.

FIG. 2 is a circuit diagram illustrating further aspects of an embodiment of the PUF generator 100. The illustrated PUF generator 100 includes a plurality of PUF cells 202 arranged into N columns and M rows. The PUF cells 202 each include a pair of transistors, 214a and 214b (collectively transistors 214). In the illustrated example, the transistors 214a, 214 are P-type transistors, though other embodiments may have a complementary design in which N-type transistors are used. Each PUF cell 202 utilizes the operational speed difference (i.e. transistor turn-on time) between the transistors 214 to create the difference for the difference generator 108. The operational speed of each transistor 214 varies due to slight variations caused by the manufacturing process. The columns of PUF cells are each connected a first bit line 204 and a second bit line 206. The bit lines 204, 206 are further connected to a plurality of sense amplifiers 110. Thus in the illustrated example each column of PUF cells 202 are connected to a respective sense amplifier 110, and the sense amplifier 110 is shared by the PUF cells 202 of the column. Each row of PUF cells 202 is connected to a word line 210. Thus, the word lines 210 are perpendicular to the bit lines 204 and bit line bars 206. The bit lines 204, 206 are each additionally connected to a discharge transistor 212 which is used to selectively connect the bit lines 204, 206 to ground in response to a pre-discharge signal. The sense amplifiers 110 are each further connected to receive a sense amplifier enable signal, SAEN. The bit lines 204, 206, word lines 210 and PUF cells 202 form the difference generator 108 of the PUF generator 102.

The PUF cells 202 each include the pair of transistors 214a and 214b. In the example shown, the transistors 214 have a first predetermined VT. In some embodiments, the transistors 214 are HVT PMOS transistors. One of the transistors 214a is connected between a power supply terminal 216 supplying Vdd and the first bit line 204 corresponding to the column that the PUF cell 202 is located in. The other transistor 214b is connected between the power supply terminal 216 and the second bit line 206 corresponding to the column that the PUF cell 202 is located in. The gate terminals of both transistors 214 of the PUF cell 202 are connected to a word line 210 corresponding to the row that the PUF cell 202 is located in. Meanwhile, the sense amplifiers 110 are implemented with a plurality of transistors having a second predetermined VT, such as LVT or SVT transistors. In some examples, the By utilizing HVT transistors for the difference generator 108, greater variation of turn-on time between pairs of transistors 214 results, leading to increased variation in which of the transistors 214 (i.e. transistor 214a or 214b) turns on first. This may provide enhanced operation of the difference generator 108 due to the larger variations as compared to a device having a lower VT, and thus less variation in turn on time. By utilizing LVT transistors for the amplifier 110, smaller variations in operation thereof is achieved leading to more consistent operation of the amplifier 110.

The example PUF generator 102 of FIG. 2 operates by first pre-discharging the pairs of bit lines 204, 206 to Vss, or ground, by turning on the discharge transistors 212. The discharge transistors 212 are then turned off. The transistors 214a, 214b of the PUF cells 202 are turned on by an active word line signal (active low signal in the illustrated embodiment) received at their respective gates from the word lines 210. This charges the first and second bit lines 204, 206 of each column. The charge time for the transistors 214a, 214b will be different due to the differences between the transistors 214a and 214b. This difference in rise time is "harvested" by the sense amplifiers 110 at a time, for example, where the difference in charge is the greatest. Thus, after a predetermined time period, the word line signal deactivates the transistors 214 of the PUF cells 202, and the sense amplifier enable signal SAEN is asserted so that a difference in voltage between the pairs of bit lines of each column is sensed and amplified by the sense amplifiers 110, each of which outputs a bit of the PUF signature in response to the voltage difference of the bit lines 204, 206. In some examples, multiple rows 210 may be activated in each cycle to generate a longer signature.

Figure 3:
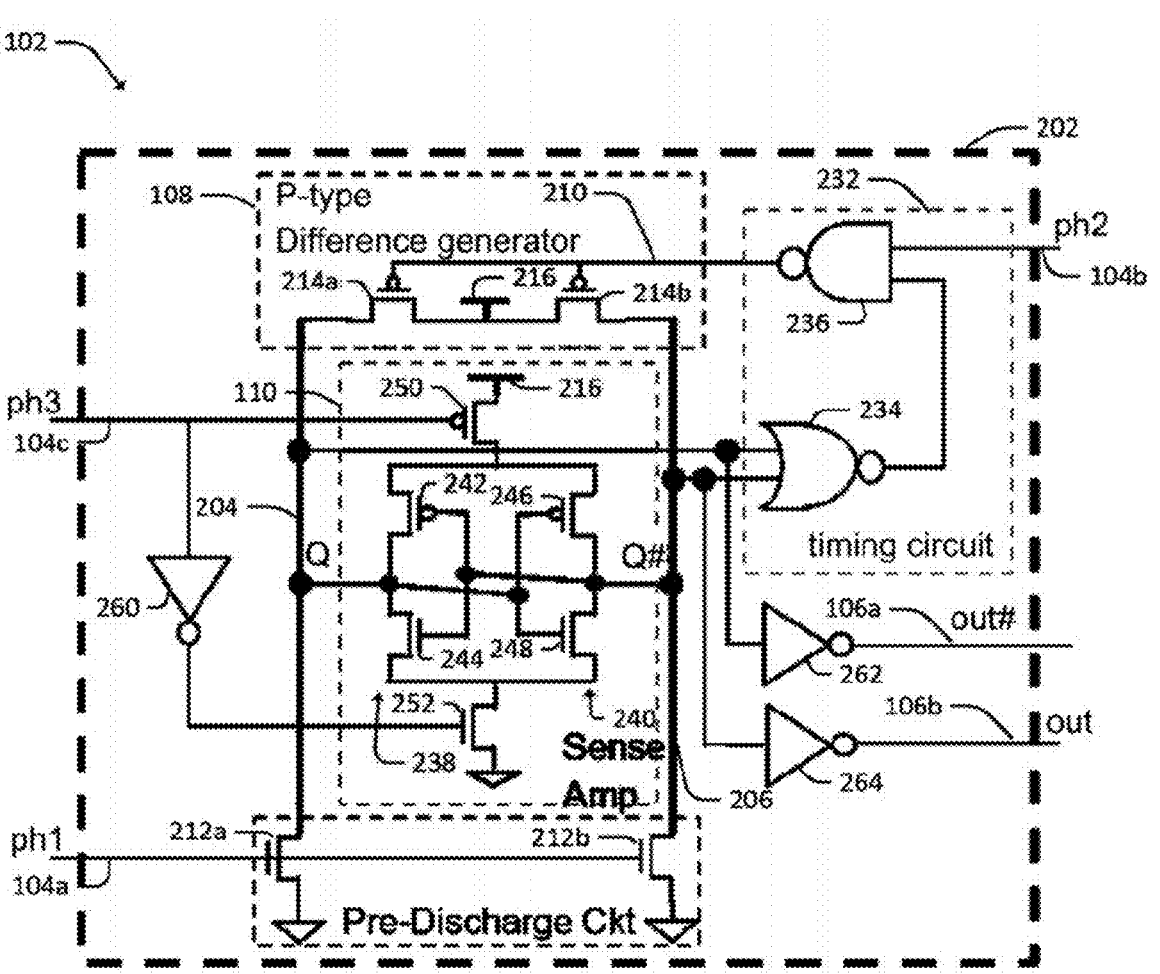
FIG. 3 is a circuit diagram illustrating another example of the PUF generator in accordance with some embodiments.

FIG. 3 is a circuit diagram illustrating an example PUF cell 202 that utilizes an amplifier 110 for each difference generator 108. In other words, the sense amplifier 110 is not shared by a plurality of difference generators 108. Thus, each PUF cell 202 includes a difference generator 108 and an amplifier 110, such as a sense amplifier. The difference generator 108 includes a pair of transistors, 214a and 214b, connected between a power supply terminal 216 and a first bit line 204 or a bit line bar 206. In the illustrated example the transistors 214a and 214b are PMOS transistors. The gate terminals of the transistors 214 are connected to receive a common timing signal from a timing circuit 232 discussed further below.

The bit line 204 and bit line bar 206 are further connected to the sense amplifier 110, as well as to a pre-discharge circuit. The pre-discharge circuit includes discharge transistors 212a and 212b (collectively discharge transistors 212) selectively connecting the bit line 240 and the bit line bar 206 to ground. The gate terminals of the discharge transistors 212 are connected to receive a first control signal ph1 via control input terminal 104a, which controls the operation of the discharge transistors 212 of the pre-discharge circuit. The bit lines 204, 206 are each further connected to complementary output terminals 106a, 106b via inverters 264 and 262.

The timing circuit 232 includes a NOR gate 234 configured to receive signals from the bit line 204 and bit line bar 206. The output of the NOR gate 234 and a second control signal ph2 received on a control input terminal 104b are input to a NAND gate 236. The output of the NAND gate 236 is connected to the word line 210 to control the operation of transistors 214a and 214b of the difference generator 108.

The amplifier 110 has outputs Q, Q # connected to the bit line 204 and the bit line bar 206, and is further connected to receive a third control signal, ph3, via a control input terminal 104c. The amplifier 110 is includes a first inverter 238 including transistors 242 and 244, a second inverter 240 including transistors 246 and 248, and header or enable transistors 250 and 252. The first and second inverters 238 and 240 are each connected between the enable transistors 250 and 252. Furthermore, the first and second inverters 238 and 240 are cross coupled, where the output of one inverter is connected to the input of the other, and vice versa. Additionally, the output Q of the first inverter 238 is connected to the bit line 204, while the output Q # of the second inverter 240 is connected to the bit line bar 206. The gate terminal of the enable transistor 250 is connected to receive ph3, while the enable transistor 252 is connected to receive ph3 via an inverter 260.

As noted above, the VT of the various transistors can be varied to improve the performance of the PUF generator 102. For example, transistors 214a and 214b of the difference generator 108 are HVT transistors in the illustrated embodiment, while transistors 242-252 of the amplifier 110 are LVT transistors. As noted above, using HVT transistors for the difference generator 108 increases the variation in turn on time for the transistors 214, which increases the variation in the PUF output bits. In contrast, using LVT transistors to implement the amplifier 110 improves consistency of the amplifier 110 operation.

An example operation of the PUF generator 102 of FIG. 3 is similar to the operation of the PUF generator 102 of FIG. 2. The PUF cell 202 operates by first pre-discharging the bit line 204 and bit line bar 206 to Vss, or ground, when ph1 moves high, thus turning on the discharge transistors 212. This results in both outputs Q and Q # going low. The low Q and Q3 output signals are received by the NOR gate 234, which therefore outputs a logic high signal. The high output of the NOR gate 234 is received by the NAND gate 236. While ph2 is low, the output of the NAND gate 236 on the word line 210 remains high, keeping the transistors 214 off.

Ph1 then moves low to turn off the discharge transistors 212, and ph2 moves high, which causes the output of the NAND gate 236 to go low. The logic low signal from the NAND gate 236 is transmitted to the gates of the transistors 214 of the difference generator 108, turning them on. Since the HVT transistors 214 have a higher variation in turn on voltage, one of the transistors 214a or 214b will likely turn on before the other. For instance, if the transistor 214a turns on first, the signal on the bit line 204 charge to logic high and the bit line bar 206 will remain low. The respective high and low bit line 204 and bit line bar 206 signals are received by the NOR gate 234, causing its output to go low. The low output from the NOR gate 234 received by the NAND gate 236 causes its output to go high. The high input output to the word line 210 turns off the transistors 214. Thus, in response to one of the bit lines going high, the timing circuit turns off the difference generator 108. A low ph3 signal turns on the amplifier 110, amplifying and latching the Q and Q # outputs, which provide the complementary PUF output bits and output terminals 106a and 106b.

Figure 4:
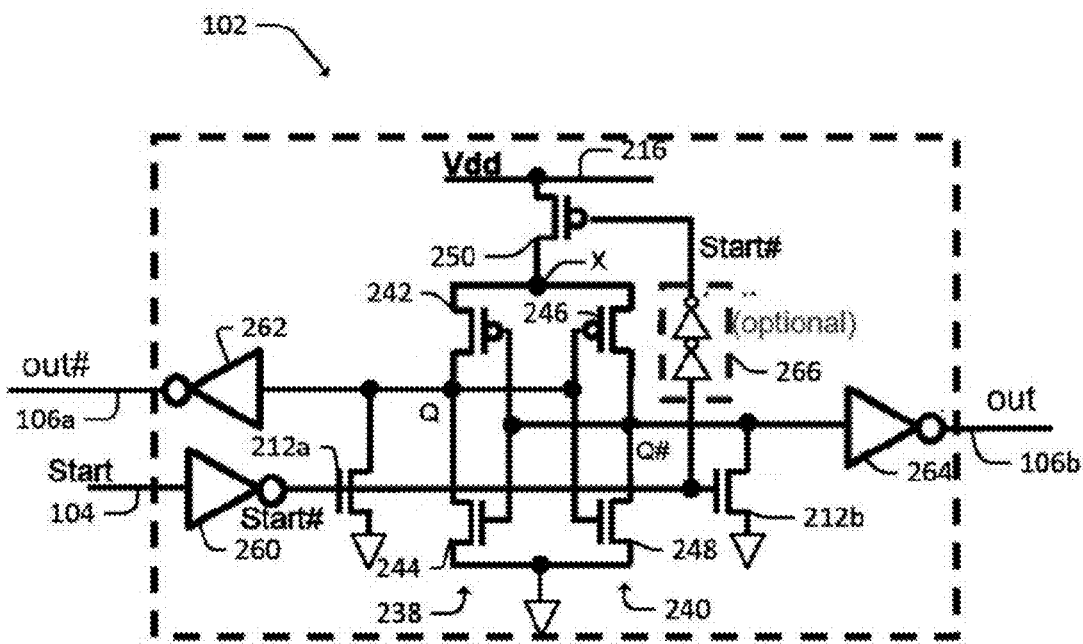
FIG. 4 is a circuit diagram illustrating a further example of the PUF generator in accordance with some embodiments.

FIG. 4 is a circuit diagram illustrating another example of the PUF generator 102. In the example shown, the circuit combines the difference generator 108 and the amplifier 110. The circuit includes a first inverter 238 including a PMOS transistor 242 and an NMOS transistor 244, and a second inverter 240 including a PMOS transistor 246 and an NMOS transistor 248. The inverters 238 and 240 are cross coupled, where the output of one is connected to the input of the other. The first and second inverters 238, 240 are connected between a ground terminal and a Vdd terminal 216 via an enable transistor 250. The output of the inverter 238 provides an output signal Q, which is selectively connected to ground via an NMOS discharge transistor 212a, and is further connected to a first output terminal 106a, via an inverter 262 to output the PUF out # signal. The second inverter 240 provides the complementary Q # signal and is selectively connected to ground via an NMOS discharge transistor 212b, and is further connected to a second output terminal 106b via another inverter 264 to output the PUF out signal.

The gate terminals of the enable transistor 250, and the discharge transistors 212a and 212b are connected to a control input terminal 104, via an inverter 260. The control input is configured to receive a control signal Start, which in some examples can be a timing signal. Optionally, a buffer 266 can be included between the gate of the enable transistor 250 and the control input terminal 104.

In the illustrated example, the PMOS transistors 250, 242, 246 are SVT transistors, while the NMOS transistors 244, 248, 212a, 212b are HVT devices. Thus, the NMOS transistors have a higher VT than the PMOS transistors in the illustrated embodiment. The increased variation of the HVT NMOS transistors increases the variation (i.e. randomness) of the turn on time of the transistors.

When the control signal Start received on the control input terminal 104 goes low, the Start # signal goes high. This turns off the enable transistor 250 and turns on the discharge transistors 212a and 212b, thus pulling both nodes Q and Q # low. The low Q and Q # signals further turn the NMOS transistors 244, 248 off. As the control signal Start is driven to high, the Start # signal goes to low. This turns off the discharge transistors 212a and 212b and turns on the enable transistor 250, causing a node X at the source terminals of transistors 242 and 246 to charge up. As node X moves toward Vdd, transistors 242 and 246 start to turn on since the signals on their gate terminals (i.e. Q and Q #) are low from the reset operation. NMOS transistors 244 and 248 are off due to the low Q and Q # signals at their gates. Due to variation in turn on time of the PMOS transistors 242 and 246, one of the transistors 242, 246 will continue to turn on (i.e. allow source to drain current flow), before the other. For example, if the PMOS transistor 242 "wins" and stays on, Q is driven high, which turns off the PMOS transistor 246 and turns on the NMOS transistor 248, both of which receive the high Q signal at their gate terminals. Thus, Q and Q # are set to high and low respectively. These signals are inverted by the inverters 262, 264 and output on the respective PUF output terminals 106*a* and 106*b*.

Figure 5:
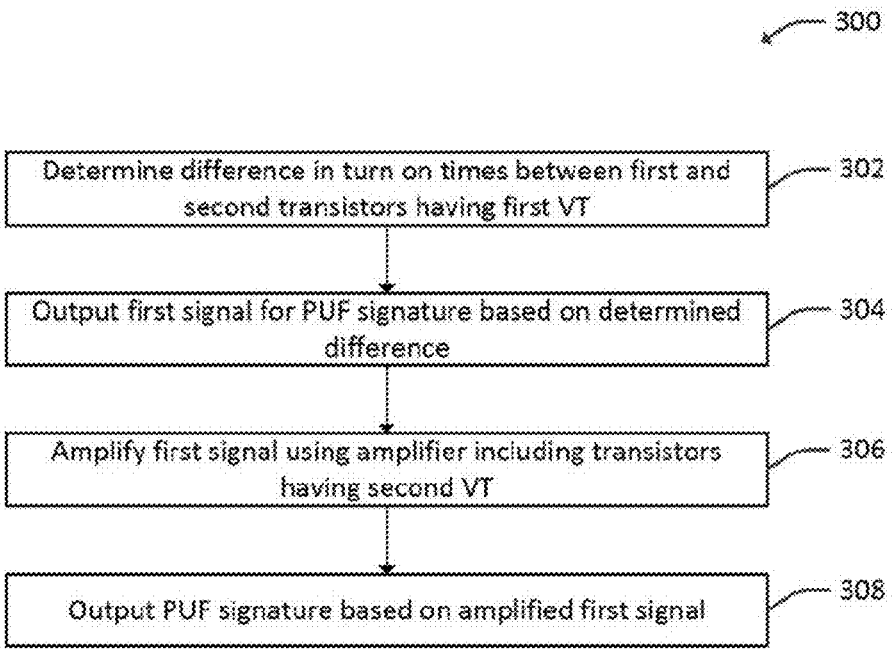
FIG. 5 is a process flow-chart illustrating an example of a method to generate a PUF signature in accordance with some embodiments.

FIG. 5 is a process flow-chart illustrating example aspects of method 300 to generate a PUF signature. At a step 302, a difference in turn on times between first and second transistors having a first predetermined VT is determined. As noted above, in some examples the first and second transistors are HVT transistors, such as the transistors 214, which increases the variation in turn-on for the transistors. A first signal for generating a PUF signature is output at step 304. The first signal is based on the determined difference in turn on times determined in step 302. At step 306, the first signal is amplified by an amplifier, such as the sense amplifier 110, which includes transistors having a second predetermined VT. In some examples the amplifier includes lower VT transistors such as LVT transistors to reduce variation of the amplifier. At step 308, the PUF signature is output based on the amplified first signal.

Thus, example PUF signature generators disclosed herein use different predetermined VT transistors for various portions of the generator. For instance, HVT devices may be used to construct a difference generator part of the PUF circuit, while the amplification and translation part may use LVT type of transistors. Among other things, this can provide a PUF cell that has maximum variations for the difference generator part, with the least variations for the amplification and translation part.

In accordance with some disclosed embodiments, a PUF generator includes a difference generator circuit with first and second transistors having a first predetermined VT. The difference generator circuit is configured to provide a first output signal for generating a PUF signature based on respective turn on times of the first and second transistors. An amplifier includes a plurality of transistors having a second predetermined VT. The amplifier is configured to receive the first output signal and output the PUF signature.

In accordance with further disclosed embodiments, a circuit includes first and second PMOS transistors having a first predetermined VT connected between a power supply terminal and respective first and second output terminals. First and second NMOS transistors have a second predetermined VT and are respectively connected between the first and second output terminals and a ground terminal. The first and second PMOS transistors and the first and second NMOS transistors are configured to generate complementary PUF bits at respective first and second output terminals based on turn on times of the first and second NMOS transistors and/or the first and second PMOS transistors.

In accordance with still further disclosed embodiments, a method includes determining a difference in turn on times between first and second transistors having a first predetermined VT. A first signal for generating a physically unclonable function (PUF) signature is output based on the determined difference. The first signal is amplified by an amplifier including transistors having a second predetermined VT. The PUF signature is output based on the amplified first signal.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A physically unclonable function (PUF) generator, comprising:
    a plurality of first transistors each connected to a power supply voltage and each having a first predetermined threshold voltage (VT);
    a plurality of second transistors each connected to the power supply voltage and each having the first predetermined VT, wherein each of the plurality of first transistors is connected to a first bit line and each of the plurality of second transistors is connected to a second bit line; and
    an amplifier including a plurality of third transistors each having a second predetermined VT that is different than the first predetermined VT and having a first input connected to the first bit line and a second input connected to the second bit line and configured to output a PUF signature based on differences in turn on times of the plurality of first transistors and the plurality of second transistors.

2. The PUF generator of claim 1, comprising a plurality of the amplifiers, wherein each of the plurality of the amplifiers is configured to output a respective bit of the PUF signature.

3. The PUF generator of claim 1, comprising a pre-discharge circuit coupled to the first bit line and configured to set a first output signal to a predetermined value.

4. The PUF generator of claim 1, comprising a pre-discharge circuit coupled to the second bit line and configured to set a second output signal to a predetermined value.

5. The PUF generator of claim 1, comprising a pre-discharge circuit including a first NMOS transistor and a second NMOS transistor configured to selectively connect the first bit line and the second bit line, respectively, to ground.

6. The PUF generator of claim 1, wherein the plurality of first transistors and the plurality of second transistors are PMOS transistors.

7. The PUF generator of claim 1, wherein the first predetermined VT is higher than the second predetermined VT.

8. The PUF generator of claim 1, wherein the first predetermined VT is a high threshold voltage.

9. The PUF generator of claim 1, wherein the second predetermined VT is a low threshold voltage.

10. The PUF generator of claim 1, comprising a plurality of word lines, wherein gates of the plurality of first transistors and the plurality of second transistors are connected to the plurality of word lines.

11. A physically unclonable function (PUF) generator, comprising:
  a first transistor that is connected to a power supply voltage and a first output, the first transistor having a first predetermined threshold voltage (VT);
  a second transistor that is connected to the power supply voltage and a second output, the second transistor having the first predetermined VT; and
  an amplifier including a plurality of transistors each having a second predetermined VT that is different than the first predetermined VT, the plurality of transistors providing a first inverter having a first inverter input connected to the second output and a first inverter output connected to the first output and a second inverter having a second inverter input connected to the first output and a second inverter output connected to the second output for generating a PUF signature based on differences in turn on times of the first transistor and the second transistor.

12. The PUF generator of claim 11, comprising a pre-discharge circuit coupled to the first transistor and configured to set the first output to a predetermined value.

13. The PUF generator of claim 11, comprising a pre-discharge circuit including a first NMOS transistor and a second NMOS transistor configured to selectively connect the first output and the second output, respectively, to ground.

14. The PUF generator of claim 11, wherein the first transistor and the second transistor are PMOS transistors.

15. The PUF generator of claim 11, wherein the first predetermined VT is higher than the second predetermined VT.

16. The PUF generator of claim 11, comprising a timing circuit connected to the amplifier and gates of the first transistor and the second transistor, the timing circuit configured to bias the first transistor and the second transistor in response to signals on the first output and the second output.

17. A circuit, comprising:
  a first inverter having a first output and including a first PMOS transistor having a first predetermined voltage threshold (VT) and connected to a first NMOS transistor having a second predetermined VT that is different than the first predetermined VT;
  a second inverter having a second output and including a second PMOS transistor having the first predetermined VT and connected to a second NMOS transistor having the second predetermined VT; and
  a discharge circuit including a third NMOS transistor configured to selectively connect the first output to a reference voltage and a fourth NMOS transistor configured to selectively connect the second output to the reference voltage,
  wherein the first inverter and the second inverter are cross-coupled inverters that generate a physically unclonable function (PUF) bit based on differences in turn on times of the first inverter and the second inverter.

18. The circuit of claim 17, wherein the first predetermined VT is a standard threshold voltage and the second predetermined VT is a high threshold voltage.

19. The circuit of claim 17, comprising a third PMOS transistor having the first predetermined VT and connected between a power supply terminal and the first PMOS transistor and between the power supply terminal and the second PMOS transistor.

20. The circuit of claim 17, wherein the first and second PMOS transistors and the first and second NMOS transistors are configured to generate complementary PUF bits at the respective first and second outputs based on differences in turn on times of the first and second NMOS transistors and/or the first and second PMOS transistors.

* * * * *